US008280787B1

(12) United States Patent
Gandhi

(10) Patent No.: US 8,280,787 B1
(45) Date of Patent: Oct. 2, 2012

(54) METHOD AND SYSTEM FOR RECOMMENDING A CHANGE OF BANK ACCOUNT BASED ON ACTUAL FINANCIAL DATA

(75) Inventor: Sharad B. Gandhi, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 501 days.

(21) Appl. No.: 12/507,219

(22) Filed: Jul. 22, 2009

(51) Int. Cl.
G07B 17/00 (2006.01)
G07F 19/00 (2006.01)
G06Q 40/00 (2006.01)

(52) U.S. Cl. .......................................... 705/30; 705/43
(58) Field of Classification Search .................... 705/30, 705/43
See application file for complete search history.

(56) References Cited

U.S. PATENT DOCUMENTS

| | | | | | |
|---|---|---|---|---|---|
| 4,264,808 | A | * | 4/1981 | Owens et al. | 705/30 |
| 5,930,764 | A | * | 7/1999 | Melchione et al. | 705/7.29 |
| 6,394,341 | B1 | * | 5/2002 | Makipaa et al. | 235/379 |
| 6,505,168 | B1 | * | 1/2003 | Rothman et al. | 705/7.34 |
| 6,988,084 | B1 | * | 1/2006 | DiBacco | 705/38 |
| 7,200,578 | B2 | * | 4/2007 | Paltenghe et al. | 705/74 |
| 7,536,325 | B2 | * | 5/2009 | Randell et al. | 705/30 |
| 7,672,865 | B2 | * | 3/2010 | Kumar et al. | 705/7.33 |
| 7,769,682 | B2 | * | 8/2010 | Moudgal | 705/38 |
| 2005/0222957 | A1 | * | 10/2005 | Understein | 705/43 |
| 2005/0240456 | A1 | * | 10/2005 | Ward et al. | 705/7 |
| 2006/0178986 | A1 | * | 8/2006 | Giordano et al. | 705/40 |
| 2007/0118394 | A1 | * | 5/2007 | Cahoon | 705/1 |
| 2008/0040129 | A1 | * | 2/2008 | Cauwels et al. | 705/1 |
| 2008/0082427 | A1 | * | 4/2008 | Gandhi et al. | 705/28 |
| 2008/0109378 | A1 | * | 5/2008 | Papadimitriou | 705/36 R |
| 2008/0270164 | A1 | * | 10/2008 | Kidder et al. | 705/1 |
| 2009/0055295 | A1 | * | 2/2009 | Bargil | 705/30 |
| 2009/0132347 | A1 | * | 5/2009 | Anderson et al. | 705/10 |
| 2009/0254476 | A1 | * | 10/2009 | Sharma et al. | 705/39 |
| 2009/0328089 | A1 | * | 12/2009 | Pradeep et al. | 725/12 |
| 2010/0057590 | A1 | * | 3/2010 | Wesby | 705/27 |
| 2010/0100461 | A1 | * | 4/2010 | Laing et al. | 705/30 |
| 2010/0100469 | A1 | * | 4/2010 | Buchanan et al. | 705/35 |
| 2010/0153239 | A1 | * | 6/2010 | Liebich et al. | 705/30 |
| 2010/0161600 | A1 | * | 6/2010 | Higgins et al. | 707/736 |
| 2010/0228651 | A1 | * | 9/2010 | Becerra et al. | 705/34 |

OTHER PUBLICATIONS

Retail Location Analysis: Jonathan Reynolds: Journal of Targeting, London, May 2005, vol. 13, Iss 3, p. 258, 9 pages.*

* cited by examiner

*Primary Examiner* — Matthew Gart
*Assistant Examiner* — Harshad Parikh
(74) *Attorney, Agent, or Firm* — McKay and Hodgson, LLP; Philip McKay; Sean P. Lewis

(57) ABSTRACT

A method and system for recommending a bank account based on consumer financial data whereby financial transaction data, including banking transaction data, associated with a given consumer is obtained from one or more sources. The financial transaction data is then analyzed to identify one or more consumer bank account usage attributes associated with the given consumer. Data representing one or more bank accounts currently available, and one or more banking features associated with the one or more bank accounts currently available, is obtained from one or more sources and stored in an available bank accounts database. The available bank accounts database is then searched using the data representing the identified one or more consumer bank account usage attributes to find one or more bank accounts currently available having banking features that are advantageous to the given consumer. The given consumer is then provided access to data indicating the one or more bank accounts having banking features that are advantageous to the given consumer.

14 Claims, 2 Drawing Sheets

METHOD AND SYSTEM FOR RECOMMENDING A CHANGE OF BANK ACCOUNT BASED ON ACTUAL FINANCIAL DATA

BACKGROUND

In a world of almost limitless communication and information sharing capabilities, many consumers suffer from information overload and most have very limited time to focus on anything more than the issues necessary to conduct their day-to-day lives. As a result, many consumers often fail to recognize and make sound financial decisions simply because they are confused by too much data and/or because they do not have time to perform the analysis required to make the best decision. The result is often significant inertia with respect to making any change, even though a given change could result in significant financial advantage to the consumer. One area where this consumer inertia plays a significant role is in the area of banking and, in particular, bank accounts, and/or accounts with various other types of financial institutions, such as checking and savings accounts.

Herein, the terms "bank account" and "account" are used interchangeably and include any account with a bank or financial institution. Herein, any account with a bank or financial institution is also referred to generically as a "bank account".

Herein the terms "bank" and "financial institution" are used interchangeably and include any entity offering a "bank account" to a consumer. Herein, any entity offering a "bank account" to a consumer is also referred to generically as a "bank".

Currently, banks offer a wide variety of bank account types that have distinct operating parameters and features. Some examples of these bank account features include, but are not limited to: the interest rate paid and/or requirements for receiving a given interest rate; minimum balances required; maximum activity/transactions allowed; ATM/debit card privileges; ATM fees charged; on-line banking privileges; paperless statements; checking and check fees; links/data transfers to financial management systems; overdraft protection; overdraft fees charged; direct deposit capability; cash advances; and numerous other features.

These features of bank accounts are often offered in combinations that attempt to strike a balance between the interest yield associated with a given bank account and the features offered in association with the given bank account. For instance, some bank accounts pay relatively high interest but require minimum balances, and/or have limited features, and/or impose specified maximum levels of activity. In other cases, some bank accounts pay relatively low interest but include various features free of charge, or at a discounted fee. More specifically, a given bank account may pay relatively high interest but require a minimum balance, provide no ATM and/or debit card capability, and provide no checking capability. As another example, a given bank account may pay relatively high interest but charge fees for ATM use, fees for checks, fees for on-line banking, and various other fees. In contrast, another bank account may offer lower interest but offer all, or some, of these features at a lower cost, or free of charge.

Not only does the combination of bank account features vary from bank-to-bank, but it is often the case that different types of bank accounts, with different combinations of bank account features, are offered through the same bank.

With the numerous variations in the combination of bank account features available for numerous different bank accounts, most consumers can save significant money by carefully choosing a bank account having the combination of bank account features most directly aligned with the consumer's banking activity. However, as noted above, there is significant consumer inertia and bank consumers often fail to change bank accounts, despite the fact that they often would benefit from such a change. As noted above, one reason for this significant resistance to change is that the time and energy associated with the data gathering and analysis necessary to choose the best bank account is often deemed by the consumer to be too burdensome and not worth the effort involved.

As a result of the situation discussed above, every year millions of banking consumers pay more banking fees then they need to, and do not take advantage of discounted and/or free bank account benefits available though existing bank accounts offering a combination of bank account features aligned with the consumer's banking activity.

SUMMARY

In accordance with one embodiment, a method and system for recommending a bank account based on consumer financial data includes a process for recommending a bank account based on consumer financial data whereby, in one embodiment, financial transaction data, including banking transaction data, associated with a given consumer is obtained from one or more sources. In one embodiment, the financial transaction data associated with the given consumer is analyzed to identify one or more consumer bank account usage attributes associated with the given consumer. In one embodiment, data representing the identified one or more consumer bank account usage attributes associated with the given consumer are correlated and/or mapped to the given consumer and then stored in a data storage means. In one embodiment, data representing one or more bank accounts currently available, and one or more banking features associated with the one or more bank accounts currently available, is obtained from one or more sources. In one embodiment, the one or more bank accounts currently available are categorized according to the one or more banking features associated with the one or more bank accounts currently available. In one embodiment, data representing the categorization of the one or more bank accounts currently available and/or at least part of the obtained data representing the one or more bank accounts currently available, and one or more banking features associated with the one or more bank accounts, is stored in an available bank accounts database. In one embodiment, the available bank accounts database is then searched using the data representing the identified one or more consumer bank account usage attributes associated with the given consumer to find one or more of the one or more bank accounts currently available having banking features that are advantageous to the given consumer in light of the one or more consumer bank account usage attributes associated with the given consumer. In one embodiment, the given consumer is then provided access to data indicating the one or more of the one or more bank accounts available having banking features that are advantageous to the given consumer in light of the one or more consumer bank account usage attributes associated with the given consumer.

In one embodiment, the financial transaction data, including banking transaction data, associated with the given consumer includes, but is not limited to: data indicating one or more bank accounts associated with the consumer maintained with one or more financial institutions and/or financial transaction data associated with one or more bank accounts associated with the consumer maintained with one or more financial institutions; data indicating withdraws over a given time period from one or more of the one or more bank accounts associated with the consumer; data indicating deposits over a given time period to one or more of the one or more bank accounts associated with the consumer; data indicating all transactions in a given time period involving one or more of the one or more bank accounts associated with the consumer; data indicating average balances in one or more of the one or more bank accounts associated with the consumer over a given period of time; data indicating the minimum balance in one or more of the one or more bank accounts associated with the consumer over a given period of time; data indicating the maximum balance in one or more of the one or more bank accounts associated with the consumer over a given period of time; data indicating debit card transactions associated with one or more of the one or more bank accounts associated with the consumer; data indicating the number of ATM withdraws from one or more of the one or more bank accounts associated with the consumer over a given period of time; data indicating the location the given consumer during transactions involving one or more of the one or more bank accounts associated with the consumer; data indicating any interest or penalties associated with one or more of the one or more bank accounts associated with the consumer; data indicating any fees incurred as a result of any transactions involving one or more of the one or more bank accounts associated with the consumer over a given period of time; data indicating direct deposit activity associated with one or more of the one or more bank accounts associated with the consumer over a given period of time; data indicating any overdrafts from one or more of the one or more bank accounts associated with the consumer; data indicating the use of checks drawn on funds in one or more of the one or more bank accounts associated with the consumer over a given period of time; data indicating the use of "on-line banking" and/or bill payment services associated with one or more of the one or more bank accounts associated with the consumer over a given period of time; and/or any other data associated with one or more of the one or more bank accounts associated with the consumer available, and/or desired, and/or deemed of interest by the provider of the process for recommending a bank account based on consumer financial data and/or the given consumer.

In one embodiment, the financial transaction data, including banking transaction data, associated with the given consumer is obtained by the process for recommending a bank account based on consumer financial data through a financial management system that implements, includes, is accessible by, and/or is otherwise associated with, the process for recommending a bank account based on consumer financial data.

Herein, a financial management system can be, but is not limited to, any data management system implemented on a computing system, and/or accessed through a network, that gathers financial data, including banking and financial transactional data, from one or more sources such as one or more accounts with one or more banks and financial institutions, and/or offers the capability to analyze and categorize at least part of the financial data. Herein, a financial management system can be, but is not limited to, any of the following: a computing system and/or network implemented personal financial management system; a computing system and/or network implemented business financial management system; an on-line banking system; a computing system and/or network implemented home and/or business inventory system; a computing system and/or network implemented personal and/or business asset management system; a computing system and/or network implemented personal and/or business accounting system; a computing system and/or network implemented personal and/or business tax preparation system; a computing system and/or network implemented healthcare management system; and/or any of the numerous computing system and/or network implemented data management systems discussed herein, and/or known to those of skill in the art at the time of filing, and/or as developed after the time of filing, that include the capability to analyze and categorize financial data from multiple sources.

Specific examples of financial management systems include, but are not limited to: Quicken™, available from Intuit Inc. of Mountain View, Calif.; Quicken On-Line™, available from Intuit Inc. of Mountain View, Calif.; Personal Financial Management™, available from Digital Insight, Inc. of Calabasas, Calif.; QuickBooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other financial management systems discussed herein, and/or known to those of skill in the art at the time of filing, and/or as developed after the time of filing.

Current financial management systems are typically software and/or Web-based applications which, along with a parent computing system or device, and/or a network, help consumers manage their finances by providing a centralized interface with banks, credit card companies, asset account providers, mortgage companies, retirement account providers and other various financial institutions and asset management institutions and/or accounts, for identifying, processing, storing, and categorizing consumer financial transactions. Currently, financial management systems typically obtain most, if not all, of the consumer's financial and/or transactional data from all, or most, of the accounts used by, available to, or associated with, a consumer, as well as a significant amount of the consumer's demographic and personal data.

Currently, some financial management systems also typically obtain highly detailed financial transaction information from all, or most, sources used by the consumer, including all, or most, of the accounts used by, available to, or associated with, a consumer, via communication with banks, credit card providers, or other financial institutions, using data entry, links to databases, and electronic data transfer systems such as the Open Financial Exchange (OFX) specification, or various other systems for transferring financial transaction data.

Using some financial management systems, the banking and/or financial transaction information, payee identification, payee location, payment amount, date of the transaction, products and/or services purchased via the transaction, various tags and/or labels, and other data is often used by the financial management system to process, categorize and/or tag individual financial transactions as a particular type of income or expense, to generate various financial reports, and to create an overview of the consumer's financial situation based on input from multiple, and often all, available sources of financial information regarding a given consumer. Some currently offered financial management systems then use this financial transaction information to track events, such as pending payments, recurring payments, and projected balances, and to provide various historical personal and business data reports or displays including "to date" data reports, such as historical and/or to-date spending and projected balance data reports, for all, or most, of the accounts used by, available to, or associated with, a given consumer.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from, one or more banks, and/or any other financial institutions, and/or any other financial data source via any network or network system, as discussed herein, and/or available or known at the time of filing, and/or as later developed.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, via a consumer interface device, such as a keyboard, mouse, touchpad, voice recognition software, or any other device and/or system capable of providing input to a computing system and/or for translating various actions into computing system operations, whether available or known at the time of filing or as developed later.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from a database maintained by one or more banks and/or any other financial institution or data source, as discussed herein, and/or available or known at the time of filing, and/or as later developed.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from a computer program product, as defined herein.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer banking and/or financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer banking and/or financial transactions.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, at least part of the financial transaction data, including banking transaction data, associated with the given consumer is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from any combination of the above sources and/or from any other source of financial data associated with the given consumer whether known at the time of filing or as developed thereafter.

In one embodiment, the financial transaction data associated with the given consumer is analyzed by one or more processors associated with one or more computing systems to identify one or more consumer bank account usage attributes associated with the given consumer.

In one embodiment, the financial transaction data associated with the given consumer is analyzed to identify one or more consumer bank account usage attributes associated with the given consumer such as, but not limited to, any one or more of the following: the name of the financial institutions associated with the one or more bank accounts associated with the consumer; how many withdraws the given consumer makes over a given time period from one or more of the one or more bank accounts associated with the consumer; how many deposits the given consumer makes over a given time period to one or more of the one or more bank accounts associated with the consumer; how many total transactions the given consumer conducts in a given time period involving one or more of the one or more bank accounts associated with the consumer; average balances the given consumer maintains in one or more of the one or more bank accounts associated with the consumer over a given period of time; the minimum balance the given consumer maintains in one or more of the one or more bank accounts associated with the consumer over a given period of time; the maximum balance the given consumer attains in one or more of the one or more bank accounts associated with the consumer over a given period of time; debit card transactions the given consumer conducts associated with one or more of the one or more bank accounts associated with the consumer over a given period of time; the number of ATM withdraws the given consumer makes from one or more of the one or more bank accounts associated with the consumer over a given period of time; the location of the given consumer when transactions involving one or more of the one or more bank accounts associated with the consumer are conducted; any interest or penalties the given consumer earns/incurs from one or more of the one or more bank accounts associated with the consumer over a given period of time; any fees incurred by the given consumer as a result of any transactions involving one or more of the one or more bank accounts associated with the consumer over a given period of time; any direct deposits made on behalf of the given consumer to one or more of the one or more bank accounts associated with the consumer over a given period of time; any overdrafts from one or more of the one or more bank accounts associated with the consumer over a given period of time; checks drawn on one or more of the one or more bank accounts associated with the consumer over a given period of time; use of "on-line banking" and/or bill payment services associated with one or more of the one or more bank accounts associated with the consumer over a given period of time; and/or any other bank account usage attributes associated with the given consumer identifiable, and/or deemed of interest, by the provider of the process for recommending a bank account based on consumer financial data and/or the given consumer.

In one embodiment, the given consumer is provided an opportunity to review and filter, weight, prioritize and/or edit bank account usage attributes, identified as being associated with the given consumer. In one embodiment, the process for recommending a bank account based on consumer financial data filters, weights, prioritizes and/or edits bank account usage attributes identified as being associated with the given consumer.

In one embodiment, data representing the identified one or more consumer bank account usage attributes associated with the given consumer are correlated with the given consumer and stored in any data storage means, as discussed herein, and/or as known in the art at the time of filing, and/or as developed after the time of filing.

In one embodiment, the data representing one or more bank accounts currently available, and one or more banking features associated with the one or more bank accounts, includes, but is not limited to: data indicating the financial institutions associated with the one or more bank accounts currently available; data indicating how many withdraws can be made over a given time period from the one or more bank accounts currently available; data indicating how many deposits can be made over a given time period to the one or more bank accounts currently available; data indicating how many total transactions can be conducted in a given time period involving the one or more bank accounts currently available; data indicating average balances required in the one or more bank accounts currently available over a given period of time; data indicating the minimum balances that must be maintained in the one or more bank accounts currently available; data indicating any debit card privileges and/or fees associated with the one or more bank accounts currently available; data indicating any ATM privileges and/or fees associated with the one or more bank accounts currently available; data indicating the location the branches of the financial institutions offering the one or more bank accounts currently available; data indicating any interest or penalties, and requirements to receive defined rates of interest, associated with the one or more bank accounts currently available; data indicating any usage or other fees/penalties associated with the one or more bank accounts currently available; data indicating direct deposit capabilities associated with the one or more bank accounts currently available; data indicating overdraft policies and charges associated with the one or more bank accounts currently available; data indicating any check privileges and/or fees associated with the one or more bank accounts currently available; data indicating any "on-line banking" and/or bill payment services, limits, and/or fees associated with the one or more bank accounts currently available; and/or data indicating any other banking features associated with the one or more bank accounts currently available, deemed of interest by the provider of the process for recommending a bank account based on consumer financial data and/or the given consumer.

In one embodiment, at least part of the data representing one or more bank accounts currently available, and one or more banking features associated with the one or more bank accounts, is obtained by the process for recommending a bank account based on consumer financial data through analysis of financial transaction data, including banking transaction data, as discussed above, obtained from multiple consumers.

In one embodiment, at least part of the data representing one or more bank accounts currently available, and one or more banking features associated with the one or more bank accounts, is obtained by the process for recommending a bank account based on consumer financial data through analysis of financial transaction data, including banking transaction data, as discussed above, obtained from multiple consumers through one or more financial management systems that implement, include, are accessible by, and/or are otherwise associated with, the process for recommending a bank account based on consumer financial data.

As noted above, herein, a financial management system can be, but is not limited to, any data management system implemented on a computing system, and/or accessed through a network, that gathers banking and/or financial data, including banking and/or financial transactional data, from one or more sources such as one or more bank accounts with one or more financial institutions, and/or offers the capability to analyze and categorize at least part of the banking and/or financial data. Herein, a financial management system can be, but is not limited to, any of the following: a computing system and/or network implemented personal financial management system; a computing system and/or network implemented business financial management system; an on-line banking system; a computing system and/or network implemented home and/or business inventory system; a computing system and/or network implemented personal and/or business asset management system; a computing system and/or network implemented personal and/or business accounting system; a computing system and/or network implemented personal and/or business tax preparation system; a computing system and/or network implemented healthcare management system; and/or any of the numerous computing system and/or network implemented data management systems discussed herein, and/or known to those of skill in the art at the time of filing, and/or as developed after the time of filing, that include the capability to analyze and categorize financial data from multiple sources.

As also noted above, specific examples of financial management systems include, but are not limited to: Quicken™, available from Intuit Inc. of Mountain View, Calif.; Quicken On-Line™, available from Intuit Inc. of Mountain View, Calif.; Personal Financial Management™, available from Digital Insight, Inc. of Calabasas, Calif.; QuickBooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other financial management systems discussed herein, and/or known to those of skill in the art at the time of filing, and/or as developed after the time of filing.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more banks, and/or any other financial institutions.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more banks, and/or any other financial institutions, via any network or network system, as discussed herein, and/or available or known at the time of filing, and/or as later developed.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more banks, and/or any other financial institutions, from a database maintained by one or more banks and/or any other financial institution or data source, as discussed herein, and/or available or known at the time of filing, and/or as later developed.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more banks, and/or any other financial institutions, by embedding the data in, or on, a computer program product, as defined herein.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer financial transactions.

In one embodiment, at least part of the data representing one or more bank accounts currently available, and one or more banking features associated with the one or more bank accounts, is provided to, and/or entered into, and/or transferred to, and/or downloaded to, and/or otherwise obtained by, the process for recommending a bank account based on consumer financial data, and/or a financial management system associated with the process for recommending a bank account based on consumer financial data, from one or more banks, and/or any other financial institutions, by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, the one or more bank accounts currently available are then categorized according to the banking features associated with the one or more bank accounts currently available. In one embodiment, data representing the categorization of the one or more bank accounts currently available and/or at least part of the obtained data representing one or more bank accounts currently available, and one or more banking features associated with the one or more bank accounts, is then stored in an available bank accounts database that is any database as discussed herein, and/or as known in the art at the time of filing, and/or as developed after the time for filing. For instance in various embodiments, the available bank accounts database can be, but is not limited to, any data storage device, a designated server system or computing system, or a designated portion of one or more server systems or computing systems, or a distributed database, or an external and/or portable hard drive, a dedicated mass storage device implemented in software, hardware, or a combination of hardware and software, and/or a web-based function.

In one embodiment, the data representing the categorization of the one or more bank accounts currently available and/or at least part of the obtained data representing one or more bank accounts currently available, and one or more banking features associated with the one or more bank accounts, in the available bank accounts database is searched using the data representing the identified one or more consumer bank account usage attributes associated with the given consumer. In one embodiment, the data representing the categorization of the one or more bank accounts currently available and/or at least part of the obtained data representing one or more bank accounts currently available, and one or more banking features associated with the one or more bank accounts, in the available bank accounts database is searched using the data representing the identified one or more consumer bank account usage attributes associated with the given consumer to find one or more of the one or more bank accounts available having banking features that are advantageous to the given consumer in light of the one or more consumer bank account usage attributes associated with the given consumer.

In one embodiment, the given consumer is then provided access to data indicating the one or more of the one or more bank accounts available having banking features that are advantageous to the given consumer via any means, method, mechanism, procedure, process, or system for displaying, transferring, and/or otherwise providing a consumer access to data, as discussed herein, and/or as known in the art at the time of filing, and/or as developed after the time of filing.

In one embodiment, the data collected via the process for recommending a bank account based on consumer financial data, and in particular, the data representing the identified one or more consumer bank account usage attributes associated with one or more consumers, is of significant value to financial institutions for determining what banking features they might wish to offer to attract more consumers. Consequently, in one embodiment, one or more financial institutions are offered access to data indicating the identified one or more consumer bank account usage attributes associated with one or more consumers.

Using the method and system for recommending a bank account based on consumer financial data, as disclosed herein, consumers are provided bank account recommendations based on the consumers' actual bank account usage. Using the method and system for recommending a bank account based on consumer financial data, as disclosed herein, the recommendations are made without the consumer having to gather the information about their own bank account usage, or gather data about available bank accounts, or trying to analyze this significant amount of information. Consequently, using the method and system for recommending a bank account based on consumer financial data, as disclosed herein, consumer inertia to making a bank account change is readily overcome and millions of banking consumers can avoid paying unnecessary fees, and begin using more free or low cost benefits, by taking advantage of existing bank accounts offering the combination of bank account features most directly aligned with the consumer's banking activity.

As discussed in more detail below, using the below embodiments, with little or no modification and/or consumer input, there is considerable flexibility, adaptability, and opportunity for customization to meet the specific needs of various consumers under numerous circumstances.

Figure 1:
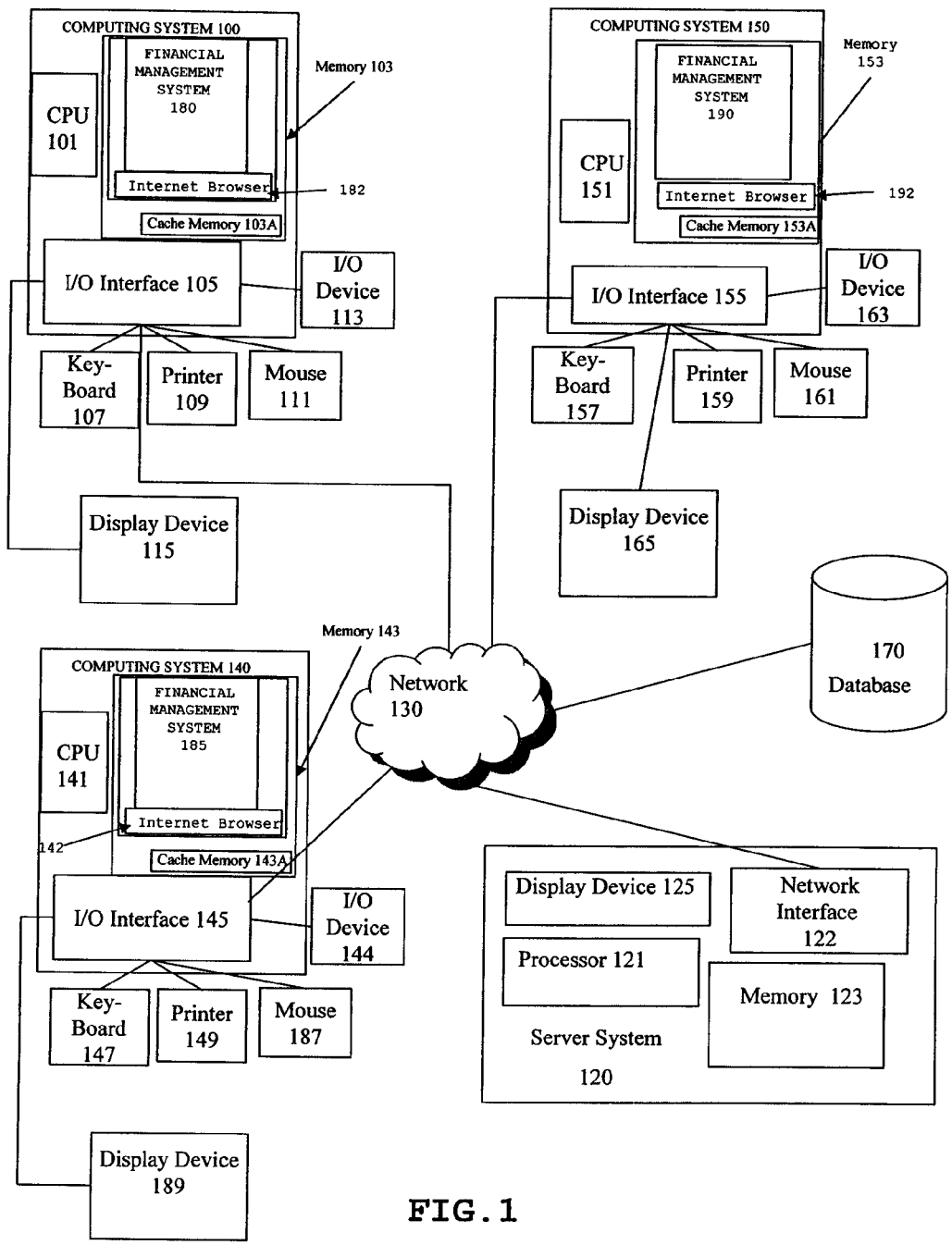
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and system for recommending a bank account based on consumer financial data includes a process for recommending a bank account based on consumer financial data whereby, in one embodiment, financial transaction data, including banking transaction data, associated with a given consumer is obtained from one or more sources. In one embodiment, the financial transaction data associated with the given consumer is analyzed to identify one or more consumer bank account usage attributes associated with the given consumer. In one embodiment, data representing the identified one or more consumer bank account usage attributes associated with the given consumer are correlated and/or mapped to the given consumer and then stored in a data storage means. In one embodiment, data representing one or more bank accounts currently available, and one or more banking features associated with the one or more bank accounts currently available, is obtained from one or more sources. In one embodiment, the one or more bank accounts currently available are categorized according to the one or more banking features associated with the one or more bank accounts currently available. In one embodiment, data representing the categorization of the one or more bank accounts currently available and/or at least part of the obtained data representing the one or more bank accounts currently available, and one or more banking features associated with the one or more bank accounts, is stored in an available bank accounts database. In one embodiment, the available bank accounts database is then searched using the data representing the identified one or more consumer bank account usage attributes associated with the given consumer to find one or more of the one or more bank accounts currently available having banking features that are advantageous to the given consumer in light of the one or more consumer bank account usage attributes associated with the given consumer. In one embodiment, the given consumer is then provided access to data indicating the one or more of the one or more bank accounts available having banking features that are advantageous to the given consumer in light of the one or more consumer bank account usage attributes associated with the given consumer.

FIG. 1 is a block diagram of an exemplary hardware architecture for implementing one embodiment of a system and method for recommending a bank account based on consumer financial data, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a financial management system 180, such as any financial management system defined herein, known in the art at the time of filing, and/or as developed thereafter. In one embodiment, financial management system 180 is stored, in whole, or in part, in memory system 103, and is used by, or includes, or is accessed by, a process for recommending a bank account based on consumer financial data (not shown in FIG. 1, see FIG. 2).

Returning to FIG. 1, computing system 100 may further include standard consumer interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for recommending a bank account based on consumer financial data, and/or a financial management system 180, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, financial data associated with one or more consumers is stored, in whole, or in part, in memory system 103, and is used by, or is accessed by, a process for recommending a bank account based on consumer financial data, and/or one or more financial management systems, and/or one or more consumers. In one embodiment, computing system 100 is used, and/or accessible, by another computing system, such as computing systems 150 and/or 140 (discussed below).

Computing system 100 can be any computing system as defined herein and/or as known in the art at the time of filing and/or as developed thereafter, that includes components that can execute all, or part, of a process for recommending a bank account based on consumer financial data, and/or a financial management system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a financial management system 190, such as any financial management system defined herein, known in the art at the time of filing, and/or as developed thereafter. In one embodiment, financial management system 190 is stored, in whole, or in part, in memory system 153, and is used by, or includes, or is accessed by, and/or is otherwise associated with a process for recommending a bank account based on consumer financial data (not shown in FIG. 1, see FIG. 2).

Returning to FIG. 1, computing system 150 may further include standard consumer interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for recommending a bank account based on consumer financial data, and/or a computing system implemented financial management system 190, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, banking and/or financial data associated one or more consumers is stored, in whole, or in part, in memory system 153, and is used by, or is accessed by, a process for recommending a bank account based on consumer financial data and/or one or more financial management systems, including one or more computing system implemented financial management systems and/or network based financial management systems, and/or one or more consumers. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for recommending a bank account based on consumer financial data, and/or a computing system implemented financial management system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a financial management system 185, such as any network based financial management system defined herein, known in the art at the time of filing, and/or as developed thereafter. In one embodiment, financial management system 185 is stored, in whole, or in part, in memory system 143, and is used by, or includes, or is accessed by, a process for recommending a bank account based on consumer financial data (not shown in FIG. 1, see FIG. 2).

Returning to FIG. 1, computing system 140 may further include standard consumer interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for recommending a bank account based on consumer financial data, and/or a financial management system 185, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for recommending a bank account based on consumer financial data, and/or one or more financial management systems, and/or one or more consumers banking and/or financial activity, is stored, in whole, or in part, in memory system 143. In one embodiment, computing system 140 is a computing system accessible one or more financial management systems, and/or one or more consumers, and/or one or more banks. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for recommending a bank account based on consumer financial data, and/or a network based financial management system, in accordance with at least one of the embodiments as described herein.

Also shown in FIG. 1 is database 170. In one embodiment, database 170 is an available bank accounts database. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, a database 170 includes a web-based function. As discussed in more detail below, in one embodiment, database 170 is under the control of, or otherwise accessible by, a process for recommending a bank account based on consumer financial data, and/or one or more financial management systems, and/or one or more consumers, and/or one or more banks.

As noted above, in one embodiment, database 170 is an available bank accounts database and data representing one or more bank accounts currently available, and one or more banking features associated with the one or more bank accounts, is stored, in whole, or in part, in database 170, and is used by, or is accessed by, a process for recommending a bank account based on consumer financial data. In one embodiment, database 170 is accessible by one or more financial management systems, including one or more computing system implemented financial management systems and/or network based financial management systems, and/or one or more consumers. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data representing one or more bank accounts currently available, and one or more banking features associated with the one or more bank accounts, is obtained from, and/or stored, in whole, or in part, in server system 120, and is used by, or is accessed by, a process for recommending a bank account based on consumer financial data. In one embodiment, server system 120 is accessible by one or more financial management systems, and/or one or more consumers. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

In one embodiment, computing systems 100, 140, and 150, database 170, server system 120, and network 130 are part of a cloud computing environment.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 is not relevant.

As discussed in more detail below, in one embodiment, a process for recommending a bank account based on consumer financial data, and/or one or more financial management systems, and/or one or more computing system implemented financial management systems, and/or data associated with one or more consumers, and/or data representing the categorization of the one or more bank accounts currently available and/or data representing one or more bank accounts currently available, and one or more banking features associated with the one or more bank accounts is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for recommending a bank account based on consumer financial data, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for recommending a bank account based on consumer financial data, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for recommending a bank account based on consumer financial data, and/or a financial management system, and/or a computing system implemented financial management system, and/or data associated with one or more consumers, and/or data representing the categorization of the one or more bank accounts currently available and/or data representing one or more bank accounts currently available, and one or more banking features associated with the one or more bank accounts, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "consumer" and/or "user", are used interchangeably and include any person, party, business, system, application, organization, and/or entity interacting with, interfacing with, contacting, viewing, providing data to, accepting data from, requesting data from, and/or otherwise associating with the process for recommending a bank account based on consumer financial data for any purpose. In addition, herein the term "consumer", includes a person who is the subject of, source of, and/or target of, all, or part of, any data/information obtained and/or analysis performed by a process for recommending a bank account based on consumer financial data, and/or a legal guardian of a person who is the subject of, and/or target of, any data/information obtained and/or analysis performed by a process for recommending a bank account based on consumer financial data, and/or an authorized agent of any party using a process for recommending a bank account based on consumer financial data, and/or a person who is the subject of, and/or target of, any information obtained and/or analysis performed, by a process for recommending a bank account based on consumer financial data, and/or any other authorized party associated with any party using a process for recommending a bank account based on consumer financial data, and/or a person who is the subject of, and/or target of, any information obtained and/or analysis performed by a process for recommending a bank account based on consumer financial data.

Herein, the terms "bank account" and "account" are used interchangeably and include any account with a bank or financial institution. Herein, any account with a bank or financial institution is also referred to generically as a "bank account".

Herein the terms "bank" and "financial institution" are used interchangeably and include any entity offering a "bank account" to a consumer. Herein, any entity offering a "bank account" to a consumer is also referred to generically as a "bank".

Herein, a "financial management system" can be, but is not limited to, any network based financial management system and/or computing system implemented financial management system implemented on a computing system and/or accessed through a network that gathers financial data, including financial transactional data, from one or more sources and/or offers the capability to analyze and categorize at least part of the financial data. As used herein, the term financial management system includes, but is not limited to: computing system implemented personal and/or business financial management systems, packages, programs, modules, or applications; network based personal and/or business financial management systems, packages, programs, modules, or applications; on-line banking systems; computing system implemented personal and/or business tax preparation systems, packages, programs, modules, or applications; network based personal and/or business tax preparation systems, packages, programs, modules, or applications; computing system implemented personal and/or business accounting and/or invoicing systems, packages, programs, modules, or applications; network based personal and/or business accounting and/or invoicing systems, packages, programs, modules, or applications; and various other personal and/or business electronic data management systems, packages, programs, modules, or applications, whether known at the time of filing or as developed later. Specific examples of financial management systems include, but are not limited to: Quicken™, available from Intuit Inc. of Mountain View, Calif.; Quicken On-Line™, available from Intuit Inc. of Mountain View, Calif.; QuickBooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other financial management systems discussed herein, and/or known to those of skill in the art at the time of filing, and/or as developed after the time of filing.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for recommending a bank account based on consumer financial data includes a process for recommending a bank account based on consumer financial data whereby, in one embodiment, financial transaction data, including banking transaction data, associated with a given consumer is obtained from one or more sources. In one embodiment, the financial transaction data associated with the given consumer is analyzed to identify one or more consumer bank account usage attributes associated with the given consumer. In one embodiment, data representing the identified one or more consumer bank account usage attributes associated with the given consumer are correlated and/or mapped to the given consumer and then stored in a data storage means. In one embodiment, data representing one or more bank accounts currently available, and one or more banking features associated with the one or more bank accounts currently available, is obtained from one or more sources. In one embodiment, the one or more bank accounts currently available are categorized according to the one or more banking features associated with the one or more bank accounts currently available. In one embodiment, data representing the categorization of the one or more bank accounts currently available and/or at least part of the obtained data representing the one or more bank accounts currently available, and one or more banking features associated with the one or more bank accounts, is stored in an available bank accounts database. In one embodiment, the available bank accounts database is then searched using the data representing the identified one or more consumer bank account usage attributes associated with the given consumer to find one or more of the one or more bank accounts currently available having banking features that are advantageous to the given consumer in light of the one or more consumer bank account usage attributes associated with the given consumer. In one embodiment, the given consumer is then provided access to data indicating the one or more of the one or more bank accounts available having banking features that are advantageous to the given consumer in light of the one or more consumer bank account usage attributes associated with the given consumer.

Figure 2:
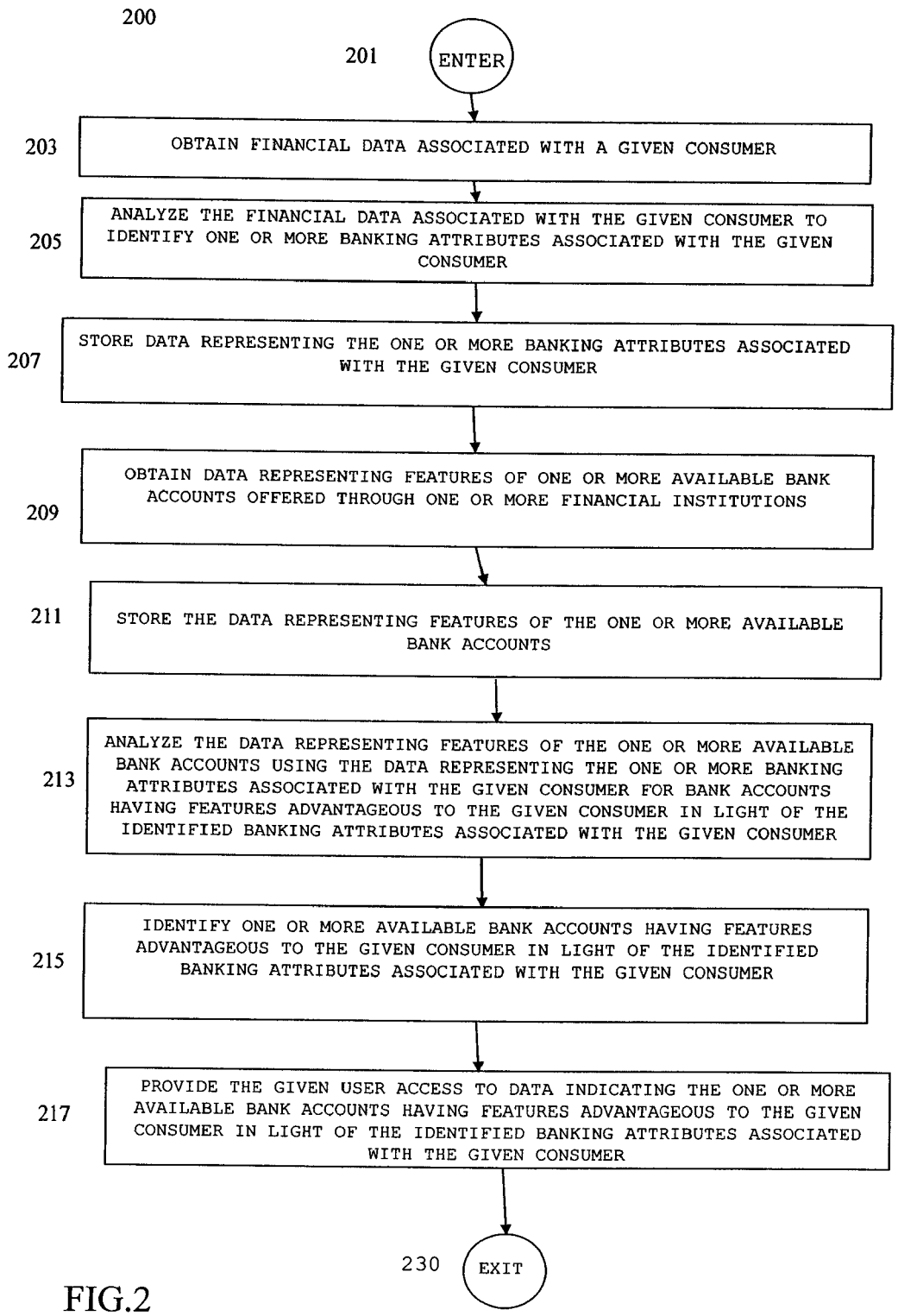
FIG. 2 is a flow chart depicting a process for recommending a bank account based on consumer financial data in accordance with one embodiment.

FIG. 2 is a flow chart depicting a process for recommending a bank account based on consumer financial data 200 in accordance with one embodiment. Process for recommending a bank account based on consumer financial data 200 begins at ENTER OPERATION 201 of FIG. 2 and process flow proceeds to OBTAIN FINANCIAL DATA ASSOCIATED WITH A GIVEN CONSUMER OPERATION 203.

In one embodiment, at OBTAIN FINANCIAL DATA ASSOCIATED WITH A GIVEN CONSUMER OPERATION 203 financial data associated with a given consumer, including financial transaction data and/or banking transaction data, is obtained from one or more sources.

In one embodiment, at OBTAIN FINANCIAL DATA ASSOCIATED WITH A GIVEN CONSUMER OPERATION 203, the financial data associated with the given consumer, including financial transaction data and/or banking transaction data, includes, but is not limited to: data indicating one or more bank accounts associated with the consumer maintained with one or more financial institutions and/or financial transaction data associated with one or more bank accounts associated with the consumer maintained with one or more financial institutions; data indicating withdraws over a given time period from one or more of the one or more bank accounts associated with the consumer; data indicating deposits over a given time period to one or more of the one or more bank accounts associated with the consumer; data indicating all transactions in a given time period involving one or more of the one or more bank accounts associated with the consumer; data indicating average balances in one or more of the one or more bank accounts associated with the consumer over a given period of time; data indicating the minimum balance in one or more of the one or more bank accounts associated with the consumer over a given period of time; data indicating the maximum balance in one or more of the one or more bank accounts associated with the consumer over a given period of time; data indicating debit card transactions associated with one or more of the one or more bank accounts associated with the consumer; data indicating the number of ATM withdraws from one or more of the one or more bank accounts associated with the consumer over a given period of time; data indicating the location the given consumer during transactions involving one or more of the one or more bank accounts associated with the consumer; data indicating any interest or penalties associated with one or more of the one or more bank accounts associated with the consumer; data indicating any fees incurred as a result of any transactions involving one or more of the one or more bank accounts associated with the consumer over a given period of time; data indicating direct deposit activity associated with one or more of the one or more bank accounts associated with the consumer over a given period of time; data indicating any overdrafts from one or more of the one or more bank accounts associated with the consumer; data indicating the use of checks drawn on funds in one or more of the one or more bank accounts associated with the consumer over a given period of time; data indicating the use of "on-line banking" and/or bill payment services associated with one or more of the one or more bank accounts associated with the consumer over a given period of time; and/or any other data associated with one or more of the one or more bank accounts associated with the consumer available, and/or desired, and/or deemed of interest by the provider of the process for recommending a bank account based on consumer financial data and/or the given consumer.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is obtained by process for recommending a bank account based on consumer financial data 200 through a financial management system, such as financial management systems 180, 185 and/or 190 of FIG. 1, that implements, includes, is accessible by, and/or is otherwise associated with, process for recommending a bank account based on consumer financial data 200 (FIG. 2).

Herein, a financial management system can be, but is not limited to, any data management system implemented on a computing system, and/or accessed through a network, that gathers financial data, including banking and financial transactional data, from one or more sources such as one or more bank accounts with one or more banks and financial institutions, and/or offers the capability to analyze and categorize at least part of the financial data. Herein, a financial management system can be, but is not limited to, any of the following: a computing system and/or network implemented personal financial management system; a computing system and/or network implemented business financial management system; an on-line banking system; a computing system and/or network implemented home and/or business inventory system; a computing system and/or network implemented personal and/or business asset management system; a computing system and/or network implemented personal and/or business accounting system; a computing system and/or network implemented personal and/or business tax preparation system; a computing system and/or network implemented healthcare management system; and/or any of the numerous computing system and/or network implemented data management systems discussed herein, and/or known to those of skill in the art at the time of filing, and/or as developed after the time of filing, that include the capability to analyze and categorize financial data from multiple sources.

Specific examples of financial management systems include, but are not limited to: Quicken™, available from Intuit Inc. of Mountain View, Calif.; Quicken On-Line™, available from Intuit Inc. of Mountain View, Calif.; Personal Financial Management™, available from Digital Insight, Inc. of Calabasas, Calif.; QuickBooks™, available from Intuit Inc. of Mountain View, Calif.; Quicken Health Expense Manager™, available from Intuit Inc. of Mountain View, Calif.;

Mint.com, available at http://www.mint.com; Microsoft Money™, available from Microsoft, Inc. of Redmond, Wash.; and/or various other financial management systems discussed herein, and/or known to those of skill in the art at the time of filing, and/or as developed after the time of filing.

Current financial management systems are typically software and/or Web-based applications which, along with a parent computing system or device, such as computing systems 100, 140 and/or 150 of FIG. 1, and/or a network, such as network 130 of FIG. 1, help consumers manage their finances by providing a centralized interface with banks, credit card companies, asset account providers, mortgage companies, retirement account providers and other various financial institutions and asset management institutions and/or accounts, for identifying, processing, storing, and categorizing consumer financial transactions. Currently, financial management systems typically obtain most, if not all, of the consumer's financial and/or transactional data from all, or most, of the accounts used by, available to, or associated with, a consumer, as well as a significant amount of the consumer's demographic and personal data.

Currently, some financial management systems also typically obtain highly detailed financial transaction information from all, or most, sources used by the consumer, including all, or most, of the accounts used by, available to, or associated with, a consumer, via communication with banks, credit card providers, or other financial institutions, using data entry, links to databases, and electronic data transfer systems such as the Open Financial Exchange (OFX) specification, or various other systems for transferring financial transaction data.

Using some financial management systems, the banking and/or financial transaction information, payee identification, payee location, payment amount, date of the transaction, products and/or services purchased via the transaction, various tags and/or labels, and other data is often used by the financial management system to process, categorize and/or tag individual financial transactions as a particular type of income or expense, to generate various financial reports, and to create an overview of the consumer's financial situation based on input from multiple, and often all, available sources of financial information regarding a given consumer. Some currently offered financial management systems then use this financial transaction information to track events, such as pending payments, recurring payments, and projected balances, and to provide various historical personal and business data reports or displays including "to date" data reports, such as historical and/or to-date spending and projected balance data reports, for all, or most, of the accounts used by, available to, or associated with, a given consumer.

Returning to FIG. 2, in one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from, one or more banks, and/or any other financial institutions, and/or any other financial data source.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, and/or any other financial data source via any network or network system, such as network 130 of FIG. 1, and/or as discussed herein, and/or available or known at the time of filing, and/or as later developed.

Returning to FIG. 2, in one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, and/or any other financial data source, through a consumer interface and a consumer interface device, such as keyboards 107, 157, 147 of FIG. 1, mice 111, 161, 187 of FIG. 1, a touchpad, voice recognition software, or any other device and/or system capable of providing input to a computing system and/or for translating various actions into computing system operations, whether available or known at the time of filing or as developed later. In some embodiments, the consumer interface is displayed on a display device such as display devices 115, 165, or 189 of FIG. 1. In some embodiments, the consumer interface is displayed on a display device of a computing system such as computing systems 100, 140, and/or 150 of FIG. 1 and/or server system 120 of FIG. 1.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from a database, such as database 170 of FIG. 1, maintained by one or more banks and/or any other financial institution or data source, as discussed herein, and/or available or known at the time of filing, and/or as later developed.

Returning to FIG. 2, in one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, and/or any other financial data source via a computer program product, as defined herein.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer banking and/or financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer banking and/or financial transactions.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, and/or any other financial data source, using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, at OBTAIN FINANCIAL DATA ASSOCIATED WITH A GIVEN CONSUMER OPERATION 203, at least part of the financial data associated with a given consumer, including financial transaction data and/or banking transaction data, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, and/or any other financial data source from any combination of the above sources and/or from any other source of financial data associated with the given consumer whether known at the time of filing or as developed thereafter.

In one embodiment, once financial data associated with a given consumer, including financial transaction data and/or banking transaction data, is obtained from one or more sources at OBTAIN FINANCIAL DATA ASSOCIATED WITH A GIVEN CONSUMER OPERATION 203, process flow proceeds to ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205.

In one embodiment, at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 the financial transaction and/or banking transaction data associated with the given consumer of OBTAIN FINANCIAL DATA ASSOCIATED WITH A GIVEN CONSUMER OPERATION 203 is analyzed to identify one or more consumer bank account usage attributes associated with the given consumer.

In one embodiment, at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 the financial transaction data associated with the given consumer is analyzed by one or more processors, such as CPU's 101, 151, 141 and processor 121 of FIG. 1, associated with one or more computing systems, such as computing systems 100, 140, 150, and/or server computing system 120 of FIG. 1, to identify one or more consumer bank account usage attributes associated with the given consumer.

Returning to FIG. 2, in one embodiment, at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205, the financial transaction data associated with the given consumer is analyzed to identify one or more consumer bank account usage attributes associated with the given consumer such as, but not limited to, any one or more of the following: the name of the financial institutions associated with the one or more bank accounts associated with the consumer; how many withdraws the given consumer makes over a given time period from one or more of the one or more bank accounts associated with the consumer; how many deposits the given consumer makes over a given time period to one or more of the one or more bank accounts associated with the consumer; how many total transactions the given consumer conducts in a given time period involving one or more of the one or more bank accounts associated with the consumer; average balances the given consumer maintains in one or more of the one or more bank accounts associated with the consumer over a given period of time; the minimum balance the given consumer maintains in one or more of the one or more bank accounts associated with the consumer over a given period of time; the maximum balance the given consumer attains in one or more of the one or more bank accounts associated with the consumer over a given period of time; debit card transactions the given consumer conducts associated with one or more of the one or more bank accounts associated with the consumer over a given period of time; the number of ATM withdraws the given consumer makes from one or more of the one or more bank accounts associated with the consumer over a given period of time; the location of the given consumer when transactions involving one or more of the one or more bank accounts associated with the consumer are conducted; any interest or penalties the given consumer earns/incurs from one or more of the one or more bank accounts associated with the consumer over a given period of time; any fees incurred by the given consumer as a result of any transactions involving one or more of the one or more bank accounts associated with the consumer over a given period of time; any direct deposits made on behalf of the given consumer to one or more of the one or more bank accounts associated with the consumer over a given period of time; any overdrafts from one or more of the one or more bank accounts associated with the consumer over a given period of time; checks drawn on one or more of the one or more bank accounts associated with the consumer over a given period of time; use of "on-line banking" and/or bill payment services associated with one or more of the one or more bank accounts associated with the consumer over a given period of time;

and/or any other bank account usage attributes associated with the given consumer identifiable, and/or deemed of interest, by the provider of the process for recommending a bank account based on consumer financial data and/or the given consumer.

In one embodiment, at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205, once the financial transaction and/or banking transaction data associated with the given consumer of OBTAIN FINANCIAL DATA ASSOCIATED WITH A GIVEN CONSUMER OPERATION 203 is analyzed and one or more consumer bank account usage attributes associated with the given consumer are identified, the given consumer is provided an opportunity to review and filter, weight, prioritize and/or edit the bank account usage attributes identified as being associated with the given consumer. This provides the consumer the opportunity to indicate which of the identified one or more consumer bank account usage attributes associated with the given consumer are of most interest to, and/or are most critical to, the given consumer. In one embodiment, the given consumer provides the filter, weighting, prioritization and/or editing input for the bank account usage attributes identified as being associated with the given consumer using a consumer interface and a consumer interface device, such as keyboards 107, 157, 147 of FIG. 1, mice 111, 161, 187 of FIG. 1, a touchpad, voice recognition software, or any other device and/or system capable of providing input to a computing system and/or for translating various actions into computing system operations, whether available or known at the time of filing or as developed later. In some embodiments, the consumer interface is displayed on a display device such as display devices 115, 165, or 189 of FIG. 1. In some embodiments, the consumer interface is displayed on a display device of a computing system such as computing systems 100, 140, and/or 150 of FIG. 1 and/or server system 120 of FIG. 1.

Returning to FIG. 2, in one embodiment, at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205, once the financial transaction and/or banking transaction data associated with the given consumer of OBTAIN FINANCIAL DATA ASSOCIATED WITH A GIVEN CONSUMER OPERATION 203 is analyzed and one or more consumer bank account usage attributes associated with the given consumer are identified, process for recommending a bank account based on consumer financial data 200 automatically or semi-automatically filters, weights, prioritizes and/or edits bank account usage attributes identified as being associated with the given consumer based on either priorities set by the provider of process for recommending a bank account based on consumer financial data 200 and/or generalized consumer input.

In one embodiment, once the financial transaction and/or banking transaction data associated with the given consumer of OBTAIN FINANCIAL DATA ASSOCIATED WITH A GIVEN CONSUMER OPERATION 203 is analyzed to identify one or more consumer bank account usage attributes associated with the given consumer at ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205, process flow proceeds to STORE DATA REPRESENTING THE ONE OR MORE BANKING ATTRIBUTES ASSOCIATED WITH THE GIVEN CONSUMER OPERATION 207.

In one embodiment at STORE DATA REPRESENTING THE ONE OR MORE BANKING ATTRIBUTES ASSOCIATED WITH THE GIVEN CONSUMER OPERATION 207 the data representing the identified one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 is correlated and/or mapped to the given consumer and then stored via any data storage means as discussed herein, and/or as known in the art at the time of filing, and/or as developed after the time of filing.

For instance, in one embodiment, at STORE DATA REPRESENTING THE ONE OR MORE BANKING ATTRIBUTES ASSOCIATED WITH THE GIVEN CONSUMER OPERATION 207 the data, in whole, or in part, is stored in a memory system, such as memory systems 103, 143, and 153 or server memory system 123, or database 170, of FIG. 1, or in a cache memory, such as cache memories 103A/153A/143A of FIG. 1, or in any main memory or mass memory, associated with a computing system, such as computing systems 100, 140, or 150 described above. In one embodiment, the data, in whole, or in part, is stored in any computing system and/or server system, such as computing systems 100, 140, or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

In one embodiment, at STORE DATA REPRESENTING THE ONE OR MORE BANKING ATTRIBUTES ASSOCIATED WITH THE GIVEN CONSUMER OPERATION 207 the data representing the identified one or more consumer bank account usage attributes associated with the given consumer is maintained by, accessible by, owned by, or otherwise related to process for recommending a bank account based on consumer financial data 200, a financial management system such as financial management systems 180, and/or 190, and/or 185 of FIG. 1, or any other party, by any one of the numerous mechanisms known to those of skill in the art.

Returning to FIG. 2, in one embodiment, once at STORE DATA REPRESENTING THE ONE OR MORE BANKING ATTRIBUTES ASSOCIATED WITH THE GIVEN CONSUMER OPERATION 207 the data representing the identified one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 is correlated and/or mapped to the given consumer and then stored via any data storage means as discussed herein, and/or as known in the art at the time of filing, and/or as developed after the time of filing, process flow proceeds to OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 data representing one or more bank accounts currently available, and one or more banking features associated with the one or more bank accounts currently available, is obtained from one or more sources and, in one embodiment, the one or more bank accounts currently available are categorized according to the one or more banking features associated with the one or more bank accounts currently available.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 the data representing one or more bank accounts currently available, and one or more banking features associated with the one or more bank accounts, includes, but is not limited to: data indicating the financial institutions associated with the one or more bank accounts currently available; data indicating how many withdraws can be made over a given time period from the one or more bank accounts currently available; data indicating how many deposits can be made over a given time period to the one or more bank accounts currently available; data indicating how many total transactions can be conducted in a given time period involving the one or more bank accounts currently available; data indicating average balances required in the one or more bank accounts currently available over a given period of time; data indicating the minimum balances that must be maintained in the one or more bank accounts currently available; data indicating any debit card privileges and/or fees associated with the one or more bank accounts currently available; data indicating any ATM privileges and/or fees associated with the one or more bank accounts currently available; data indicating the location the branches and/or ATM locations of the financial institutions offering the one or more bank accounts currently available; data indicating any interest or penalties, and requirements to receive defined rates of interest, associated with the one or more bank accounts currently available; data indicating any usage or other fees/penalties associated with the one or more bank accounts currently available; data indicating direct deposit capabilities associated with the one or more bank accounts currently available; data indicating overdraft policies and charges associated with the one or more bank accounts currently available; data indicating any check privileges and/or fees associated with the one or more bank accounts currently available; data indicating any "on-line banking" and/or bill payment services, limits, and/or fees associated with the one or more bank accounts currently available; and/or data indicating any other banking features associated with the one or more bank accounts currently available and deemed of interest by the provider of the process for recommending a bank account based on consumer financial data and/or the given consumer.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is obtained by process for recommending a bank account based on consumer financial data 200 through analysis of financial transaction data, including banking transaction data, as discussed above, obtained from multiple consumers. In one embodiment, the financial transaction data, including banking transaction data, as discussed above, obtained from multiple consumers is stored in one of more consumer financial databases, such as database 170, and/or any database as discussed herein, and/or as known at the time of filing, and/or as developed after the time of filing, maintaining the consumer financial data.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is obtained by process for recommending a bank account based on consumer financial data 200 through analysis of financial transaction data, including banking transaction data, as discussed above, obtained from multiple consumers through one or more financial management systems, such as financial management systems 180, 185 and/or 190 of FIG. 1, that implement, include, are accessible by, and/or are otherwise associated with, process for recommending a bank account based on consumer financial data 200 (FIG. 2). In one embodiment, the financial transaction data, including banking transaction data, as discussed above, obtained from multiple consumers through one or more financial management systems is stored in one or more consumer financial databases, such as database 170, and/or any database as discussed herein, and/or as known at the time of filing, and/or as developed after the time of filing, maintaining the consumer financial data.

As noted above, herein, a financial management system can be, but is not limited to, any data management system implemented on a computing system, and/or accessed through a network, that gathers banking and/or financial data, including banking and/or financial transactional data, from one or more sources such as one or more bank accounts with one or more financial institutions, and/or offers the capability to analyze and categorize at least part of the banking and/or financial data. Herein, a financial management system can be, but is not limited to, any of the following: a computing system and/or network implemented personal financial management system; a computing system and/or network implemented business financial management system; an on-line banking system; a computing system and/or network implemented home and/or business inventory system; a computing system and/or network implemented personal and/or business asset management system; a computing system and/or network implemented personal and/or business accounting system; a computing system and/or network implemented personal and/or business tax preparation system; a computing system and/or network implemented healthcare management system; and/or any of the numerous computing system and/or network implemented data management systems discussed herein, and/or known to those of skill in the art at the time of filing, and/or as developed after the time of filing, that include the capability to analyze and categorize financial data from multiple sources.

As also noted above, specific examples of financial management systems include, but are not limited to: Quicken™, available from Intuit Inc. of Mountain View, Calif.; Quicken On-Line™, available from Intuit Inc. of Mountain View, Calif.; Personal Financial Management™, available from Digital Insight, Inc. of Calabasas, Calif.; QuickBooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other financial management systems discussed herein, and/or known to those of skill in the art at the time of filing, and/or as developed after the time of filing.

Returning to FIG. 2, in one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more banks, and/or any other financial institutions, via any network or network system, such as network 130 of FIG. 1, and/or as discussed herein, and/or available or known at the time of filing, and/or as later developed.

Returning to FIG. 2, in one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from a database, such as database 170 of FIG. 1, and/or any database discussed herein, and/or known in the art at the time of filing, and/or as developed after the time of filing, maintained by one or more banks and/or any other financial institution or data source, as discussed herein, and/or available or known at the time of filing, and/or as later developed.

Returning to FIG. 2, in one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, via a computer program product, as defined herein.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to receive deposits and/or to pay for and/or conduct consumer financial transactions.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 at least part of the data representing one or more bank accounts currently available, and one or more banking features associated with the one or more bank accounts, is provided to, and/or entered into, and/or transferred to, and/or downloaded to, and/or otherwise obtained by, process for recommending a bank account based on consumer financial data 200, and/or a financial management system associated with process for recommending a bank account based on consumer financial data 200, using any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 the one or more bank accounts currently available are then categorized according to the banking features associated with the one or more bank accounts currently available. In one embodiment, at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 the one or more bank accounts currently available are categorized according to the banking features associated with the one or more bank accounts currently available by a one or more processors, such as CPUs 101, 151, and 141 and processor 121 of FIG. 1, associated with one or more computing systems, such as computing system s 100, 140, 150 and/or server computing system 120 of FIG. 1.

Returning to FIG. 2, once data representing one or more bank accounts currently available, and one or more banking features associated with the one or more bank accounts currently available, is obtained from one or more sources and, in one embodiment, the one or more bank accounts currently available are categorized according to the one or more banking features associated with the one or more bank accounts currently available at OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209, process flow proceeds to STORE THE DATA REPRESENTING FEATURES OF THE ONE OR MORE AVAILABLE BANK ACCOUNTS OPERATION 211.

In one embodiment, at STORE THE DATA REPRESENTING FEATURES OF THE ONE OR MORE AVAILABLE BANK ACCOUNTS OPERATION 211 data representing the categorization of the one or more bank accounts currently available and/or at least part of the obtained data representing the one or more bank accounts currently available, and one or more banking features associated with the one or more bank accounts, of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 is stored in an available bank accounts database.

In one embodiment, at STORE THE DATA REPRESENTING FEATURES OF THE ONE OR MORE AVAILABLE BANK ACCOUNTS OPERATION 211 data representing the categorization of the one or more bank accounts currently available and/or at least part of the obtained data representing one or more bank accounts currently available, and one or more banking features associated with the one or more bank accounts, is then stored in an available bank accounts database that is any database, such as database 170 of FIG. 1, and/or as discussed herein, and/or as known in the art at the time of filing, and/or as developed after the time for filing.

For instance, returning to FIG. 1, in one embodiment, at STORE THE DATA REPRESENTING FEATURES OF THE ONE OR MORE AVAILABLE BANK ACCOUNTS OPERATION 211 the data, in whole, or in part, is stored in a memory system, such as memory systems 103, 143, and 153 or server memory system 123, or database 170, of FIG. 1, or in a cache memory, such as cache memories 103A/153A/143A of FIG. 1, or in any main memory or mass memory, associated with a computing system, such as computing systems 100, 140, or 150 described above. In one embodiment, the data, in whole, or in part, is stored in any computing system and/or server system, such as computing systems 100, 140, or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

In one embodiment, at STORE THE DATA REPRESENTING FEATURES OF THE ONE OR MORE AVAILABLE BANK ACCOUNTS OPERATION 211 the data representing the categorization of the one or more bank accounts currently available and/or at least part of the obtained data representing the one or more bank accounts currently available, and one or more banking features associated with the one or more bank accounts, of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 is maintained by, accessible by, owned by, or otherwise related to process for recommending a bank account based on consumer financial data 200, a financial management system such as financial management systems 180, and/or 190, and/or 185 of FIG. 1, or any other party, by any one of the numerous mechanisms known to those of skill in the art.

In one embodiment, once data representing the categorization of the one or more bank accounts currently available and/or at least part of the obtained data representing the one or more bank accounts currently available, and one or more banking features associated with the one or more bank accounts, of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 is stored in an available bank accounts database at STORE THE DATA REPRESENTING FEATURES OF THE ONE OR MORE AVAILABLE BANK ACCOUNTS OPERATION 211, process flow proceeds to ANALYZE THE DATA REPRESENTING FEATURES OF THE ONE OR MORE AVAILABLE BANK ACCOUNTS USING THE DATA REPRESENTING THE ONE OR MORE BANKING ATTRIBUTES ASSOCIATED WITH THE GIVEN CONSUMER FOR BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 213.

In one embodiment at ANALYZE THE DATA REPRESENTING FEATURES OF THE ONE OR MORE AVAILABLE BANK ACCOUNTS USING THE DATA REPRESENTING THE ONE OR MORE BANKING ATTRIBUTES ASSOCIATED WITH THE GIVEN CONSUMER FOR BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 213 the available bank accounts database of STORE THE DATA REPRESENTING FEATURES OF THE ONE OR MORE AVAILABLE BANK ACCOUNTS OPERATION 211 is searched using the data representing the identified one or more consumer bank account usage attributes associated with the given consumer of STORE DATA REPRESENTING THE ONE OR MORE BANKING ATTRIBUTES ASSOCIATED WITH THE GIVEN CONSUMER OPERATION 207 to find one or more of the one or more bank accounts currently available of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 having banking features that are advantageous to the given consumer in light of the one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205.

In one embodiment at ANALYZE THE DATA REPRESENTING FEATURES OF THE ONE OR MORE AVAILABLE BANK ACCOUNTS USING THE DATA REPRESENTING THE ONE OR MORE BANKING ATTRIBUTES ASSOCIATED WITH THE GIVEN CONSUMER FOR BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 213 the data representing the categorization of the one or more bank accounts currently available and/or at least part of the obtained data representing one or more bank accounts currently available, and one or more banking features associated with the one or more bank accounts, in the available bank accounts database is searched using the data representing the identified one or more consumer bank account usage attributes associated with the given consumer to find one or more of the one or more bank accounts available having banking features that are advantageous to the given consumer in light of the one or more consumer bank account usage attributes associated with the given consumer using a processor, such as CPUs 101, 141, 151 and/or processor 120, associated with one or more computing systems, such as computing systems 100, 140 and/or 150 and server computing system 120 of FIG. 1.

Returning to FIG. 2, in one embodiment once the available bank accounts database of STORE THE DATA REPRESENTING FEATURES OF THE ONE OR MORE AVAILABLE BANK ACCOUNTS OPERATION 211 is searched using the data representing the identified one or more consumer bank account usage attributes associated with the given consumer of STORE DATA REPRESENTING THE ONE OR MORE BANKING ATTRIBUTES ASSOCIATED WITH THE GIVEN CONSUMER OPERATION 207 to find one or more of the one or more bank accounts currently available of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 having banking features that are advantageous to the given consumer in light of the one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 at ANALYZE THE DATA REPRESENTING FEATURES OF THE ONE OR MORE AVAILABLE BANK ACCOUNTS USING THE DATA REPRESENTING THE ONE OR MORE BANKING ATTRIBUTES ASSOCIATED WITH THE GIVEN CONSUMER FOR BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 213, process flow proceeds to IDENTIFY ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 215.

In one embodiment, at IDENTIFY ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 215, the analysis of ANALYZE THE DATA REPRESENTING FEATURES OF THE ONE OR MORE AVAILABLE BANK ACCOUNTS USING THE DATA REPRESENTING THE ONE OR MORE BANKING ATTRIBUTES ASSOCIATED WITH THE GIVEN CONSUMER FOR BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 213 results in one or more of the one or more bank accounts currently available of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 being identified as having banking features that are advantageous to the given consumer in light of the one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205.

In one embodiment, once one or more of the one or more bank accounts currently available of OBTAIN DATA REPRESENTING FEATURES OF ONE OR MORE AVAILABLE BANK ACCOUNTS OFFERED THROUGH ONE OR MORE FINANCIAL INSTITUTIONS OPERATION 209 are identified as having banking features that are advantageous to the given consumer in light of the one or more consumer bank account usage attributes associated with the given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 at IDENTIFY ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 215, process flow proceeds to PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217.

In one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is provided access to data indicating the one or more of the one or more bank accounts available having banking features that are advantageous to the given consumer in light of the one or more consumer bank account usage attributes associated with the given consumer of IDENTIFY ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 215.

In one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is also provided data indicating why the one or more of the one or more bank accounts available are considered to have banking features that are advantageous to the given consumer, i.e., what banking features caused the one or more of the one or more bank accounts available to be chosen.

In one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is also provided data indicating what assumptions/stipulations were used to determine that the one or more of the one or more bank accounts available are considered to have banking features that are advantageous to the given consumer. For instance, if a given one of the one or more bank accounts available was considered to have banking features that are advantageous to the given consumer based on the assumption that the consumer maintain a specific minimum balance, the given consumer is informed of this assumption/stipulation. In some embodiments, in this specific example, the given consumer is further advised of the beginning or average balance needed in the given one of the one or more bank accounts available in order to maintain the specific minimum balance in light of known and/or expected activity involving the given one of the one or more bank accounts available. In essence, in this example, the given consumer is informed of the assumed minimum balance and the projected balance of the given one of the one or more bank accounts available.

In one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is provided access to data indicating the one or more of the one or more bank accounts available having banking features that are advantageous to the given consumer via any means, method, mechanism, procedure, process, or system for displaying, transferring, and/or otherwise providing a consumer access to data, as discussed herein, and/or as known in the art at the time of filing, and/or as developed after the time of filing.

For instance, in one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is provided access to data indicating the one or more of the one or more bank accounts available having banking features that are advantageous to the given consumer via a display device, such as display devices 115, 165, 125, 189 of FIG. 1, and/or as discussed herein, and/or known in the art at the time of filing, and/or developed after the time of filing, that is accessible by the consumer. In one embodiment, the display device is associated with any computing system, such as computing systems 100, 140, 150, and server system 120, of FIG. 1, and/or as discussed herein, and/or known in the art at the time of filing, and/or as developed after the time of filing.

In other embodiments, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217 the given consumer is provided access to data indicating the one or more of the one or more bank accounts available having banking features that are advantageous to the given consumer by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

The data collected via process for recommending a bank account based on consumer financial data 200, and in particular, the data representing the identified one or more consumer bank account usage attributes associated with a given consumer of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 and STORE DATA REPRESENTING THE ONE OR MORE BANKING ATTRIBUTES ASSOCIATED WITH THE GIVEN CONSUMER OPERATION 207 obtained for multiple given consumers, is of significant value to financial institutions. In particular, this data, and potentially other data obtained and/or processed by process for recommending a bank account based on consumer financial data 200, can be used for marketing analysis and to help the to financial institutions determine what banking features they may wish to offer to attract more consumers. Consequently, in one embodiment, at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217, one or more financial institutions are offered access to data indicating the identified one or more consumer bank account usage attributes associated with one or more consumers of ANALYZE THE FINANCIAL DATA ASSOCIATED WITH THE GIVEN CONSUMER TO IDENTIFY ONE OR MORE BANKING ATTRIBUTES ASSOCIATED WITH THE GIVEN CONSUMER OPERATION 205 and STORE DATA REPRESENTING THE ONE OR MORE BANKING ATTRIBUTES ASSOCIATED WITH THE GIVEN CONSUMER OPERATION 207 and/or various other data obtained and/or processed by process for recommending a bank account based on consumer financial data 200.

In one embodiment, once the given consumer is provided access to data indicating the one or more of the one or more bank accounts available having banking features that are advantageous to the given consumer in light of the one or more consumer bank account usage attributes associated with the given consumer of IDENTIFY ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 215 at PROVIDE THE GIVEN USER ACCESS TO DATA INDICATING THE ONE OR MORE AVAILABLE BANK ACCOUNTS HAVING FEATURES ADVANTAGEOUS TO THE GIVEN CONSUMER IN LIGHT OF THE IDENTIFIED BANKING ATTRIBUTES ASSOCIATED WITH THE GIVEN CONSUMER OPERATION 217, process flow proceeds to EXIT OPERATION 230. In one embodiment, at EXIT OPERATION 230, process for recommending a bank account based on consumer financial data 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for recommending a bank account based on consumer financial data 200, consumers are provided bank account recommendations based on the consumers' actual bank account usage. Using process for recommending a bank account based on consumer financial data 200, the recommendations are made without the consumer having to gather the information about their own bank account usage, or gather data about available bank accounts, or trying to analyze this significant amount of information. Consequently, using process for recommending a bank account based on consumer financial data 200, consumer inertia to making a bank account change is readily overcome and millions of banking consumers can avoid paying unnecessary fees, and begin using more free or low cost benefits, by taking advantage of existing bank accounts offering the combination of bank account features most directly aligned with the consumer's banking activity.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "identifying", "analyzing", "presenting", "defining", "saving", "displaying", "categorizing", "providing", "processing", "obtaining", "comparing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for recommending a bank account based on consumer financial data comprising:

obtaining data representing one or more bank accounts currently available;

obtaining consumer financial banking transaction data from multiple contributing consumers, and analyzing that obtained consumer financial transaction data to derive one or more banking features associated with the one or more bank accounts currently available;

categorizing the one or more bank accounts currently available according to the one or more banking features associated with the one or more bank accounts currently available;

storing data representing the categorization of the one or more bank accounts currently available and at least part of the obtained data representing the one or more bank accounts currently available, and one or more banking features associated with the one or more bank accounts, in an available bank accounts database;

obtaining financial data associated with a given consumer, the financial data associated with the given consumer including data indicating one or more bank accounts associated with the given consumer and one or more banking transactions conducted involving one or more of the one or more bank accounts associated with the given consumer, the financial data further including one or more of:

data indicating one or more bank accounts associated with the consumer maintained with one or more financial institutions, data indicating transactions in a given time period involving one or more of the one or more bank accounts associated with the consumer, data indicating average balances in one or more of the one or more bank accounts associated with the consumer over a given period of time, data indicating a minimum balance in one or more of the one or more bank accounts associated with the consumer over a given period of time, data indicating a maximum balance in one or more of the one or more bank accounts associated with the consumer over a given period of time, data indicating debit card transactions associated with one or more of the one or more bank accounts associated with the consumer, data indicating a number of ATM withdrawals from one or more of the one or more bank accounts associated with the consumer over a given period of time' data indicating a location of the given consumer during one or more transactions involving one or more of the one or more bank accounts associated with the consumer, data indicating any interest associated with one or more of the one or more bank accounts associated with the consumer, data indicating any penalties associated with one or more of the one or more bank accounts associated with the consumer, data indicating any fees incurred as a result of any transactions involving one or more of the one or more bank accounts associated with the consumer over a given period of time, data indicating direct deposit activity associated with one or more of the one or more bank accounts associated with the consumer over a given period of time;

data indicating any overdrafts from one or more of the one or more bank accounts associated with the consumer, data indicating use of checks drawn on funds in one or more of the one or more bank accounts associated with the consumer over a given period of time, and data indicating use of "on-line banking" and bill payment services associated with one or more of the one or more bank accounts associated with the consumer over a given period of time;

using one or more processors associated with one or more computing systems to analyze the financial data associated with the given consumer to identify one or more consumer bank account usage attributes associated with the given consumer;

associating data representing the one or more consumer bank account usage attributes associated with the given consumer with data representing the given consumer and storing the data representing the given consumer and the data representing one or more consumer bank account usage attributes associated with the given consumer in a data storage means;

using one or more processors associated with one or more computing systems to search the available bank accounts database using the data representing the identified one or more consumer bank account usage attributes associated with the given consumer to find one or more of the one or more bank accounts currently available having banking features that are advantageous to the given consumer in light of the one or more consumer bank account usage attributes associated with the given consumer; and recommending one or more of the one or more bank accounts available having banking features that are advantageous to the given consumer by providing the given consumer access to data indicating the one or more of the one or more bank accounts available having banking features that are advantageous to the given consumer in light of the one or more consumer bank account usage attributes associated with the given consumer.

2. The computing system implemented process for recommending a bank account based on consumer financial data of claim 1, wherein;

at least part of the financial data associated with the given consumer is obtained from a financial management system.

3. The computing system implemented process for recommending a bank account based on consumer financial data of claim 1, wherein;

at least part of the financial data associated with the given consumer is obtained from a computing system implemented financial management system.

4. The computing system implemented process for recommending a bank account based on consumer financial data of claim 1, wherein;

at least part of the financial data associated with the given consumer is obtained from a network based financial management system.

5. The computing system implemented process for recommending a bank account based on consumer financial data of claim 1, wherein;

at least one of the one or more consumer bank account usage attributes associated with the given consumer includes consumer bank account usage attributes selected from the group of consumer bank account usage attributes consisting of:

the name of the financial institutions associated with the one or more bank accounts associated with the consumer;

how many withdrawals the given consumer makes over a given time period from one or more of the one or more bank accounts associated with the consumer;

how many deposits the given consumer makes over a given time period to one or more of the one or more bank accounts associated with the consumer;

how many total transactions the given consumer conducts in a given time period involving one or more of the one or more bank accounts associated with the consumer;

average balances the given consumer maintains in one or more of the one or more bank accounts associated with the consumer over a given period of time;

the minimum balance the given consumer maintains in one or more of the one or more bank accounts associated with the consumer over a given period of time;

the maximum balance the given consumer attains in one or more of the one or more bank accounts associated with the consumer over a given period of time;

debit card transactions the given consumer conducts associated with one or more of the one or more bank accounts associated with the consumer over a given period of time;

the number of ATM withdrawals the given consumer makes from one or more of the one or more bank accounts associated with the consumer over a given period of time;

the location of the given consumer when transactions involving one or more of the one or more bank accounts associated with the consumer are conducted;

any interest or penalties the given consumer earns/incurs from one or more of the one or more bank accounts associated with the consumer over a given period of time;

any fees incurred by the given consumer as a result of any transactions involving one or more of the one or more bank accounts associated with the consumer over a given period of time;

any direct deposits made on behalf of the given consumer to one or more of the one or more bank accounts associated with the consumer over a given period of time;

any overdrafts from one or more of the one or more bank accounts associated with the consumer over a given period of time;

checks drawn on one or more of the one or more bank accounts associated with the consumer over a given period of time; and use of "on-line banking" and bill payment services associated with one or more of the one or more bank accounts associated with the consumer over a given period of time.

6. The computing system implemented process for recommending a bank account based on consumer financial data of claim 1, wherein;

at least part of the data representing one or more bank accounts currently available, and one or more banking features associated with the one or more bank accounts currently available, is obtained through analysis of data obtained by a financial management system regarding two or more consumers.

7. The computing system implemented process for recommending a bank account based on consumer financial data of claim 1, wherein;

at least part of the data representing one or more bank accounts currently available, and one or more banking features associated with the one or more bank accounts currently available, includes data representing one or more bank accounts currently available, and one or more banking features associated with the one or more bank accounts currently available, selected from the group of data representing one or more bank accounts currently available, and one or more banking features associated with the one or more bank accounts currently available, consisting of:

data indicating the financial institutions associated with the one or more bank accounts currently available;

data indicating how many withdrawals can be made over a given time period from the one or more bank accounts currently available;

data indicating how many deposits can be made over a given time period to the one or more bank accounts currently available;

data indicating how many total transactions can be conducted in a given time period involving the one or more bank accounts currently available;

data indicating average balances required in the one or more bank accounts currently available over a given period of time;

data indicating the minimum balances that must be maintained in the one or more bank accounts currently available;

data indicating any debit card privileges and fees associated with the one or more bank accounts currently available;

data indicating any ATM privileges and fees associated with the one or more bank accounts currently available;

data indicating the location of the branches and ATM locations of the financial institutions offering the one or more bank accounts currently available;

data indicating any interest or penalties, and requirements to receive defined rates of interest, associated with the one or more bank accounts currently available;

data indicating any usage or other fees/penalties associated with the one or more bank accounts currently available;

data indicating direct deposit capabilities associated with the one or more bank accounts currently available;

data indicating overdraft policies and charges associated with the one or more bank accounts currently available;

data indicating any check privileges and fees associated with the one or more bank accounts currently available; and data indicating any "on-line banking" and bill payment services, limits, and fees associated with the one or more bank accounts currently available.

8. A system for recommending a bank account based on consumer financial data comprising:

a computing system having at least one processor; and at least one memory coupled to the at least one processor, the at least one memory having instructions stored therein which when executed by the processor perform a process for recommending a bank account based on consumer financial data, the process for recommending a bank account based on consumer financial data comprising:

obtaining data representing one or more bank accounts currently available;

obtaining consumer financial banking transaction data from multiple contributing consumers, and analyzing that obtained consumer financial transaction data to derive one or more banking features associated with the one or more bank accounts currently available;

categorizing the one or more bank accounts currently available according to the one or more banking features associated with the one or more bank accounts currently available:

storing data representing the categorization of the one or more bank accounts currently available and at least part of the obtained data representing the one or more bank accounts currently available, and one or more banking features associated with the one or more bank accounts, in an available bank accounts database;

obtaining financial data associated with a given consumer, the financial data associated with the given consumer including data indicating one or more bank accounts associated with the given consumer and one or more banking transactions conducted involving one or more of the one or more bank accounts associated with the given consumer, the financial data further including one or more of:

data indicating one or more bank accounts associated with the consumer maintained with one or more financial institutions, data indicating transactions in a given time period involving one or more of the one or more bank accounts associated with the consumer, data indicating average balances in one or more of the one or more bank accounts associated with the consumer over a given period of time, data indicating a minimum balance in one or more of the one or more bank accounts associated with the consumer over a given period of time, data indicating a maximum balance in one or more of the one or more bank accounts associated with the consumer over a given period of time, data indicating debit card transactions associated with one or more of the one or more bank accounts associated with the consumer, data indicating a number of ATM withdrawals from one or more of the one or more bank accounts associated with the consumer over a given period of time, data indicating a location of the given consumer during one or more transactions involving one or more of the one or more bank accounts associated with the consumer, data indicating any interest associated with one or more of the one or more bank accounts associated with the consumer, data indicating any penalties associated with one or more of the one or more bank accounts associated with the consumer, data indicating any fees incurred as a result of any transactions involving one or more of the one or more bank accounts associated with the consumer over a given period of time, data indicating direct deposit activity associated with one or more of the one or more bank accounts associated with the consumer over a given period of time;

data indicating any overdrafts from one or more of the one or more bank accounts associated with the consumer, data indicating use of checks drawn on funds in one or more of the one or more bank accounts associated with the consumer over a given period of time, and data indicating use of "on-line banking" and bill payment services associated with one or more of the one or more bank accounts associated with the consumer over a given period of time;

using the at least one processor associated with the computing system to analyze the financial data associated with the given consumer to identify one or more consumer bank account usage attributes associated with the given consumer;

identifying one or more consumer bank account usage attributes associated with the given consumer;

associating data representing the one or more consumer bank account usage attributes associated with the given consumer with data representing the given consumer and storing the data representing the given consumer and the data representing one or more consumer bank account usage attributes associated with the given consumer in a data storage means;

using the at least one processor associated with the computing system to search the available bank accounts database using the data representing the identified one or more consumer bank account usage attributes associated with the given consumer to find one or more of the one or more bank accounts currently available having banking features that are advantageous to the given consumer in light of the one or more consumer bank account usage attributes associated with the given consumer; and recommending one or more of the one or more bank accounts available having banking features that are advantageous to the given consumer by providing the given consumer access to data indicating the one or more of the one or more bank accounts available having banking features that are advantageous to the given consumer in light of the one or more consumer bank account usage attributes associated with the given consumer.

9. The system for recommending a bank account based on consumer financial data of claim 8, wherein;

at least part of the financial data associated with the given consumer is obtained from a financial management system.

10. The system for recommending a bank account based on consumer financial data of claim 8, wherein;

at least part of the financial data associated with the given consumer is obtained from a computing system implemented financial management system.

11. The system for recommending a bank account based on consumer financial data of claim 8, wherein;

at least part of the financial data associated with the given consumer is obtained from a network based financial management system.

12. The system for recommending a bank account based on consumer financial data of claim 8, wherein;

at least one of the one or more consumer bank account usage attributes associated with the given consumer includes consumer bank account usage attributes selected from the group of consumer bank account usage attributes consisting of:

the name of the financial institutions associated with the one or more bank accounts associated with the consumer;

how many withdrawals the given consumer makes over a given time period from one or more of the one or more bank accounts associated with the consumer;

how many deposits the given consumer makes over a given time period to one or more of the one or more bank accounts associated with the consumer;

how many total transactions the given consumer conducts in a given time period involving one or more of the one or more bank accounts associated with the consumer;

average balances the given consumer maintains in one or more of the one or more bank accounts associated with the consumer over a given period of time;

the minimum balance the given consumer maintains in one or more of the one or more bank accounts associated with the consumer over a given period of time;

the maximum balance the given consumer attains in one or more of the one or more bank accounts associated with the consumer over a given period of time;

debit card transactions the given consumer conducts associated with one or more of the one or more bank accounts associated with the consumer over a given period of time;

the number of ATM withdrawals the given consumer makes from one or more of the one or more bank accounts associated with the consumer over a given period of time;

the location of the given consumer when transactions involving one or more of the one or more bank accounts associated with the consumer are conducted;

any interest or penalties the given consumer earns/incurs from one or more of the one or more bank accounts associated with the consumer over a given period of time;

any fees incurred by the given consumer as a result of any transactions involving one or more of the one or more bank accounts associated with the consumer over a given period of time;

any direct deposits made on behalf of the given consumer to one or more of the one or more bank accounts associated with the consumer over a given period of time;

any overdrafts from one or more of the one or more bank accounts associated with the consumer over a given period of time;

checks drawn on one or more of the one or more bank accounts associated with the consumer over a given period of time; and use of "on-line banking" and bill payment services associated with one or more of the one or more bank accounts associated with the consumer over a given period of time.

13. The system for recommending a bank account based on consumer financial data of claim 8, wherein;

at least part of the data representing one or more bank accounts currently available, and one or more banking features associated with the one or more bank accounts currently available, is obtain through analysis of data obtained by a financial management system regarding two or more consumers.

14. The system for recommending a bank account based on consumer financial data of claim 8, wherein;

at least part of the data representing one or more bank accounts currently available, and one or more banking features associated with the one or more bank accounts currently available, includes data representing one or more bank accounts currently available, and one or more banking features associated with the one or more bank accounts currently available, selected from the group of data representing one or more bank accounts currently available, and one or more banking features associated with the one or more bank accounts currently available, consisting of:

data indicating the financial institutions associated with the one or more bank accounts currently available;

data indicating how many withdrawals can be made over a given time period from the one or more bank accounts currently available;

data indicating how many deposits can be made over a given time period to the one or more bank accounts currently available;

data indicating how many total transactions can be conducted in a given time period involving the one or more bank accounts currently available;

data indicating average balances required in the one or more bank accounts currently available over a given period of time;

data indicating the minimum balances that must be maintained in the one or more bank accounts currently available;

data indicating any debit card privileges and fees associated with the one or more bank accounts currently available;

data indicating any ATM privileges and fees associated with the one or more bank accounts currently available;

data indicating the location of the branches and ATM locations of the financial institutions offering the one or more bank accounts currently available;

data indicating any interest or penalties, and requirements to receive defined rates of interest, associated with the one or more bank accounts currently available;

data indicating any usage or other fees/penalties associated with the one or more bank accounts currently available;

data indicating direct deposit capabilities associated with the one or more bank accounts currently available;

data indicating overdraft policies and charges associated with the one or more bank accounts currently available;

data indicating any check privileges and fees associated with the one or more bank accounts currently available; and data indicating any "on-line banking" and bill payment services, limits, and fees associated with the one or more bank accounts currently available.

* * * * *